United States Patent [19]
Dunder

[11] 3,726,355
[45] Apr. 10, 1973

[54] MOTOR SLED
[76] Inventor: Vilho Johannes Dunder, Storgatan 40, Haparanda, Sweden
[22] Filed: Mar. 25, 1971
[21] Appl. No.: 127,969

[30] Foreign Application Priority Data
Mar. 26, 1970 Finland.................................870

[52] U.S. Cl..................180/5 R, 305/22, 305/30
[51] Int. Cl............................................B62m 27/02
[58] Field of Search.................180/5 R; 305/22, 305/30, 27

[56] References Cited
UNITED STATES PATENTS

| 3,692,130 | 9/1972 | Stacy | 180/5 R |
| 2,041,599 | 5/1936 | Fergusson | 305/22 |
| 2,427,162 | 9/1947 | Schilling | 305/22 |
| 3,494,438 | 2/1970 | Rose | 305/30 X |
| 2,925,873 | 2/1960 | Laporte | 180/5 R |

Primary Examiner—Richard J. Johnson
Attorney—Toren & McGeady

[57] ABSTRACT

This invention relates to a motor sled or equivalent vehicle moving with the aid of one or several endless track mats, in which the support wheels of the track mat have at least partially been arranged in groups with the aid of a rocking arm system, the set of return wheels having been journalled in one end of said system. According to the invention the set of return wheels can be raised off ground contact into approximately identical position with that of the front end of the track mat.

2 Claims, 1 Drawing Figure

PATENTED APR 10 1973
3,726,355
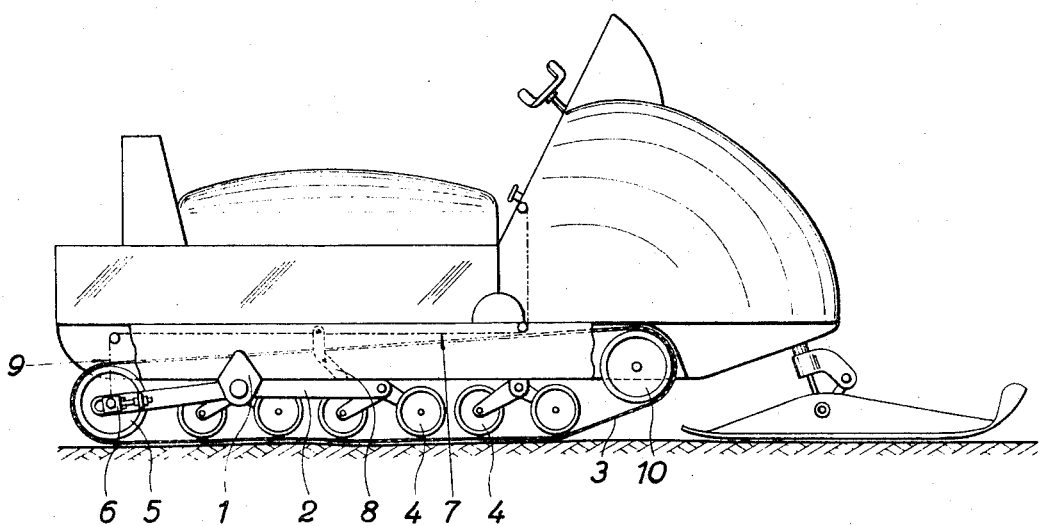
INVENTOR:
VILHO J. DUNDER
BY
Toren & McGeady
ATTORNEYS

MOTOR SLED

The present invention concerns a vehicle by which one may travel on roads or in snow-covered terrain by means of power transmitted by an endless track mat.

All previously known corresponding vehicles have a limited uphill travelling capacity and limited capacity of travelling at slow speed in uneven terrain. This is due to the fairly rigid attachment mechanism of the track in these vehicles, which does not permit the track to yield elastically in conformity with the terrain. The track of a vehicle according to the invention yields in accordance with the unevenness of the terrain, thereby rendering possible also driving at slow speed, because there always remains a sufficient traction surface of the track to provide traction.

Backing is possible, in some of the vehicles of corresponding type belonging to prior art, only on a hard base, because the rigidly mounted track tends to burrow into a soft base, e.g. into snow. In a vehicle according to the invention its track design makes backing possible also in soft terrain.

The inventor is familiar with virtually all existing motor sled designs. In only one of them a rocking arm system has been used for support of the track mat, which system in itself is known. In no connection has the use of a rocking arm system in connection with the reversing gear been disclosed. The present invention concerns in the first place this use of the rocking arm system during driving of the vehicle in reverse. The matter has been more closely specified in the claims.

In the attached drawing the invention has been illustrated, and a vehicle according to the invention may differ from the embodiment shown in several respects without any departure from the substance of the invention specified by the claims.

In the drawing, reference numeral 1 indicates the body to which the rocking arm system has been fixed. To the ends on one side of the rocking arms 2 the supporting wheels 4 for the track mat 3 have been journalled, and at the other ends the rearmost set of return wheels 5 of the track mat together with its tension adjustment 6 has been journalled.

Because of the rocking arm system, the track mat follows rather faithfully any unevenness of the terrain. The rocking arm system yields elastically when the track mat runs over an obstacle. As a result, the track mat is invariably in contact with the ground over a length equalling about one-half of the length of the track assembly, and the obstacle cannot "lift" the entire track assembly (= the entire vehicle).

This rocking arm mechanism enables the vehicle to be backed even in soft terrain (in snow). For the purpose of backing, the vehicle has been provided with a reversing gear 7, the bell crank lever 8 of which presses down on the front ends of the rocking arms 2, or the draw wire 9 of which raises the rear end of the rocking arms. By this means the set of return wheels 5 is raised off ground contact and it will be, during the period of driving in reverse, identical with the permanent arrangement of the front end of the track mat. The foremost return wheel 10 is at the same time the propulsion wheel for the track mat, and it has been fixedly journalled in the body 1 of the vehicle. When the rocking arm system is placed in its tilted position, one may simultaneously connect the transmission, by means of a reversing shifter, to act in opposite direction to that during normal driving.

I claim:

1. In a motor sled and similar vehicle comprising at least one endless track mat, a vehicle body mounted on said track mat, a first return wheel for said track mat located at the forward end of the vehicle, a second return wheel for said track mat located at the rearward end of the vehicle and spaced from said first return wheel, support wheels for said track mat located between said first and second return wheels, the vehicle being capable of forward and reversed movement and in position for forward movement said first return wheel is located spaced vertically upwardly from said second return wheel, wherein the improvement comprises a rocking arm pivotally secured to said body intermediate its ends at a location positioned between said first and second return wheels, said rocking arm having a first portion extending from its point of securement to said body rearwardly to said second return wheel and a second portion extending from its point of securement to said body forwardly toward said first return wheel and mounting at least certain of said support wheels at a location spaced forwardly of its point of securement to said body, and means associated with said rocking arm for displacing said second return wheel in the upward direction into approximately the same horizontal position as said first return wheel for positioning the rearward end of said endless track mat in approximately the same position as the forward end thereof.

2. In a motor sled and similar vehicle, as set forth in claim 1, wherein said means comprises a reversing gear, said reversing gear including a bell crank lever mounted on said body and secured to said rocking arm intermediate the point of securement of said rocking arm to said body and the location at which said support wheels are mounted on said rocking arm, and a draw wire attached to the rear end of said rocking arm adjacent said second return wheel for raising said second return wheel into position for reverse movement of the vehicle.

* * * * *